3,752,747
METHOD FOR CONTROLLING ALGAE POLLUTION
Richard W. Treharne, Xenia, Ohio, and Thomas E. Brown, Absecon, N.J., assignors to Kettering Scientific Research, Inc., Yellow Springs, Ohio
Filed Nov. 16, 1970, Ser. No. 89,983
Int. Cl. C02b 1/82; C02c 5/12
U.S. Cl. 204—149
12 Claims

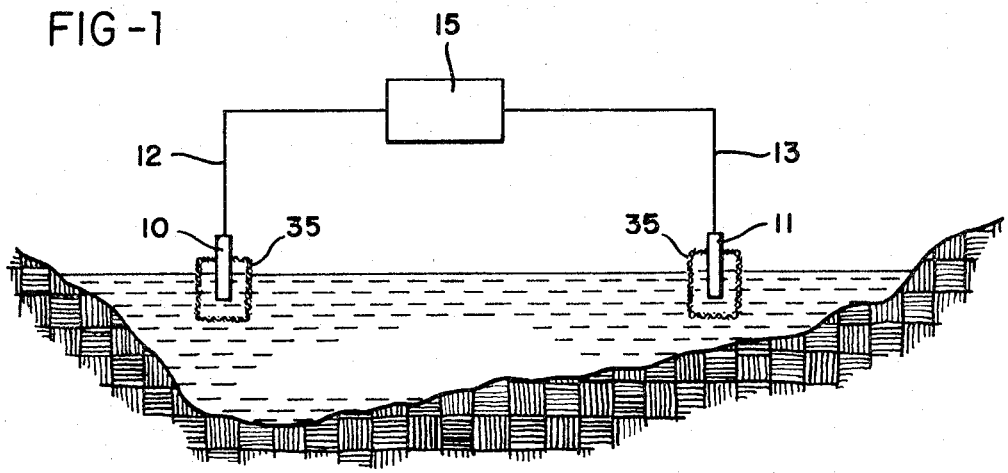
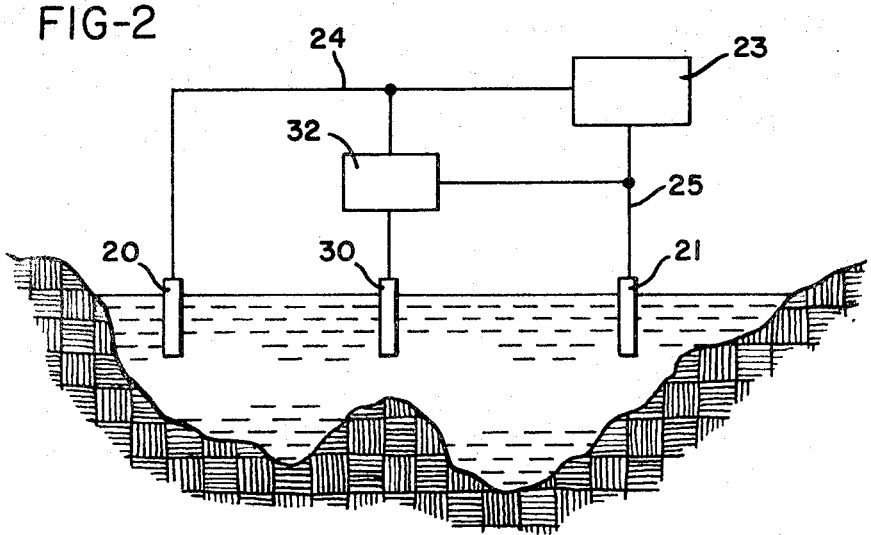

ABSTRACT OF THE DISCLOSURE

Water in ponds, aquaria, streams and other open systems and the like exposed to light is subjected to electrolysis with electrochemically inert electrodes or with an electrochemically active anode and an electrochemically inert cathode to destroy or to control the growth of algae. A current density is maintained at a level high enough to destroy the algae, and low enough to be harmless to human and fish life. When an active anode is used it releases metal ions toxic to algae, and a detector electrode is used to sense the toxic ion concentration so that a predetermined concentration lethal to algae is maintained. Essentially the same system may be used for the destruction of bacteria, such as E. coli, R. rubrum, Chromatium, Azotobacter, R, rubrum mutant (R–26), and the like.

BACKGROUND OF THE INVENTION

Algal pollution is one of the many factors threatening our water resources. Although it may be considered a secondary rather than a primary cause of water pollution, algal pollution is, nevertheless, an increasing menace to our water resources.

Limited algal growth in our water supply is not harmful and, in fact, is essential in most cases since algae serve as a source of food for fish and other aquatic life. However, excessive algal growth can pollute our water resources and kill fish life. It can also plug water filtration systems in water treatment plants, interfere with cooling towers and industrial water uses, interfere with recreational activities, and create other nuisance problems as well.

Algal pollution is most prevalent in areas where inorganic salts and fixed nitrogen compounds, in some form such as nitrates, are present in excess quantity. Through the process of photosynthesis, algae convert carbon dioxide from the atmosphere into a wide variety of organic compounds which can produce noxious tastes and odors when they decompose.

Excessive algal growth can be restricted by controlling the supply of inorganic salts, phosphates and fixed nitrogen available. In actual practice, this method of control is not feasible. Therefore, a chemical additive, such as cupric sulfate, which is toxic to algae, generally is used to control algal growth. The major drawback to algicide chemicals is that they are not conveniently applied and are often difficult to regulate. Excessive amounts can be toxic to aquatic life and, in some cases, even more dangerous to water supplies than the algae itself.

In addition to the reduction in growth rate and destruction of algae, another source of pollution is bacterial in nature, e.g., E. coli from raw sewage and the like, and other bacteria such as R. rubrum, Chromatium, Azotobacter, R. rubrum mutant (R–26), for example.

Various methods of sterilizing or clarifying contaminated water have been developed. For example, bacteria and microorganisms such as algae have been killed by the arc discharge of stored electrical energy within the water medium, as disclosed in U.S. Patent No. 3,402,120. However, this method requires a high voltage and is dangerous to fish life. It also presents problems if large bodies of water are to be treated.

Alternating electric current has been used to electrolyze microorganisms in sewage and increase the rate of metabolism and rate of decomposition, as disclosed in U.S. Patent No. 3,192,146. Also, electric current has been used to reduce the impurities in swimming pool water and the like. For example, bacteria and algal growth have been controlled by adding sodium chloride to pool water and electrolyzing the water mass to oxidize the organic constituents, as disclosed in U.S. Patent No. 3,458,414. Other compounds added to water for electrolysis purposes include a fluoride compound for clarifying water, disclosed in U.S. Patent No. 3,414,497, silver ions for killing bacteria, disclosed in U.S. Patent No. 3,334,135, and a hypochloride salt for the same purpose, disclosed in U.S. patent No. 3,334,035.

None of the above patents were concerned solely with the control and destruction of algal growths. Moreover, each of the electrolysis methods discussed above have the serious disadvantage of requiring periodic addition of chemicals to the water mass.

While it is known to use anodes in closed systems for the purpose of protecting metal structures, such systems do not involve destruction of algae. For example, water storage tanks for industry and municipal water supplies sometimes include high silicon ion anodes for the purpose of protecting the structural steel tank from corrosion. Such tanks are normally closed in the sense that the water in the tank is not exposed to light, and moreover, the water generally does not include the chemicals which promote algal growth.

SUMMARY OF THE INVENTION

The present invention is directed to a new and improved method of reducing algal pollution in open aqueous bodies without the addition of chemical additives. Generally, the invention is directed to the use of electrolysis for this purpose and includes the step of impressing between a pair of electrodes immersed in the polluted water an electrolytic potential high enough to control and/or to kill algae and bacteria and low enough to be harmless to human and fish life.

In accordance with the invention, the electrolytic potential may be impressed between two electrodes which are both "inert" in the sense that they do not contribute metallic ions to the water body, or between two electrodes at least one of which is "active" in that it does contribute metallic ions to the water body. The inert electrodes are preferably comprised of materials such as graphite, stainless steel, and high silicon content iron, whereas the active electrode is preferably comprised of copper or aluminum.

An electrolytic potential impressed between the inert electrodes destroys the algae by electrolysis only, while an electrolytic potential impressed between at least one active electrode and another electrode will, if properly polarized, destroy algae by electrolysis and also by releasing ions which are toxic to algae above a given ion coconcentration into the water. Most forms of algae are destroyed by impressing, per liter of polluted water, about 15 volts and 150 milliamperes of electrolytic potential between the electrodes over a 72-hour period. This amounts to an expenditure of about 0.25 kilowatt-hour of electrical energy.

When an electrochemically active electrode is used, the preferred form of the invention includes a detector electrode for monitoring the copper ion concentration in the water, and a switching mechanism which is responsive to the detector electrode. When the copper ion concentration reaches a predetermined level of toxicity, the switching mechanism either interrupts the potential completely, or reverses the polarity between the electrodes, to control the toxic ion concentration at the predetermined level.

BRIEF DESCRIPTION OF THE DRAWING

FIG. 1 is a schematic illustration of one embodiment of the invention; and

FIG. 2 is a schematic illustration of another embodiment of the invention.

DESCRIPTION OF THE PREFERRED EMBODIMENTS

The present invention is directed to the control of algal growth in an open water body by electrolysis. Specifically, the electrolytic application of electric current to heavy populations of algae, present in a water medium, has been found to reduce markedly the number of viable organisms and to reduce markedly their growth rate. Further, the degree of effectiveness of electrolysis as a means of killing algae populations has been found to be influenced by the duration and intensity of the electric current used. However, the exact mechanism by which electrolysis affects algal life is not completely clear.

The algal cell consists essentially of an internal nucleus bounded by a cytoplasmic or mucoid membrane which comprises the cell wall. The cell wall is surrounded by a photosynthetic unit. This unit includes a chloroplast reinforced with layers (Lamellae) of cellular material. The chloroplast contains chlorophyll which absorbs light and converts metallic nutrients in the water into cellular matter by the process of photosynthesis.

Table I lists the algae species commonly found in algal polluted waters:

TABLE I

| | |
|---|---|
| *Amphora exigua* | *Micrasterias americana* |
| *Amphidinium sp.* | *Nannocloris coccoides* |
| *Anabaena variabilis* (*Astasia longa*) | *Navicula pelliculosa* |
| *Botrydiopsis alpina* | *Nostoc Muscorum* |
| *Chlamydomonas reinhardtii* | *Peelimonas sp.* |
| *Chloroococcum wimmeri* | *Ochromonas danica* |
| *Chloroglea fritzii* | *Phormidium luridum* |
| *Chlorella protothecoides* | *P. persicinum* |
| *C. pyrenoidosa* | *Plectonema boryanum* |
| *C. pyrenoidosa* 7-11-05 high temperature strain | *Porphyridium sp.* |
| *C. pyrenoidosa* T-4 mutant | *Porphyridium aerugineum* |
| *C. vulgaris* | *P. cruentum* |
| *Cosmarium botrydis* | *Porphyridium violacium* |
| *Cryptomonas ovata* | *Scenedesmus quadricauda* |
| *Cyanidium caldarum* | *Sorocarpus uvaeformis* |
| *Cyclotella sp.* | *Stephanoptera sp.* |
| *Dunaliella salina* | *Tribonema aequale* |
| *Euglena gracilis* Z | *Batrachospermum moniliforme* |
| *Haematococcus pluvalis* | *Wolfia sp.* |
| *Heteromastix angulata* | *Sphacelaria* |

So far as is known, electrolysis without the addition of chemical additives is an entirely new approach to algal pollution control. Its effectiveness has been verified by electron micrographs of *Plectonema boryanum* algae cells taken at various stages of electrolysis. The electron micrographs clearly indicate that electrolysis destroys algal growth potential. The micrographs show that the gross effect of electrolysis upon algae is first to disintegrate the chlorophyll-containing cellular layers or lamellae, (this is prominently evidenced by a loss of chlorophyll content), then to fracture the cell wall, and finally to destroy the internal structure of the cell. The loss of chlorophyll content is a prominent observation, being accompanied by the loss of green coloring.

Several explanations for electrolytic destruction of algae cells are possible. One possible explanation is that the algae cells deteriorate because electrolysis removes, by electrolytic deposition, the vital metallic nutrients necessary for their growth. It is known, for example, that electrolysis reduces metallic ions in solutions which tend to be precipitated from the water in the region of the cathode.

This explanation is in part based on the relationship between the metabolism of algal cells and certain nutrients present in water as dissolved metallic ions. Each of the algal species listed in Table I depends upon a certain combination of metallic nutrients for its survival. Two essential metal nutrients, iron and calcium are primary constituents of the algal cell. Iron ions are a vital constituent of the chloroplast, and are essential to the metabolism of many algal species. Calcium is essential to the maintenance of cytoplasmic membranes and is also found in wall structures. In addition to iron and calcium, algae also depend heavily upon the following metals: potassium, magnesium, and sodium.

Also, many algae demand trace amounts of the following metals: manganese, boron, copper, molybdenum, vanadium, cobalt, and zinc.

One experiment buttresses the conclusion that metallic ions are removed from water by electrolytic deposition. Water from a hard water well field was subjected to electrolysis, and it was found that over 40% of the calcium ions were precipitated as calcium carbonate. This experiment therefore demonstrates that essential metallic nutrients such as calcium are in fact removed from water by electrolysis.

Thus, the lethal effect of electrolysis on algae is believed to be chiefly attributable to the removal of available nutrients, which, in turn, decreases the rate of photosynthesis and growth. The deterioration of the *Plectonema boryanum* cells, observed through electron micrographs and referred to above, correlates with this theory.

Another possible expanation relates to the oxidation of hydroxyl ions and the production of hydrogen and oxygen as by-products of electrolysis. It is possible that the nascent oxygen produced by the electrolytic process has a destructive effect upon algal cells. Algal growth may also be limited by a localized pH change in the vicinity of the electrodes.

In the final analysis, it is likely that all of the above factors contribute to the destruction of algae cells; the cells deteriorate because the vital nutrients are complexed and deposited out of the nutrient medium at the cathode, nascent oxygen produced at the anode is toxic to the algae cells; and a localized pH change in the vicinity of the electrodes limits algal growth.

In addition to destruction of algae, the system of the present invention has also been demonstrated to be effective in control of bacterial contamination of water in open bodies or in secondary treatment of wastes before discharge in open waters. Typical of the bacteria destroyed or substantially reduced are the species *E. coli, R. rubrum, R. rubrum* mutant (R-26), *Chromatium* and *Azotobacter*.

In accordance with the invention, therefore, and referring to FIG. 1, a pair of metal electrodes 10 and 11 are immersed in an algal polluted open body of water, such as a pond, reservoir, river, fish tank, swimming pool, or the like. The electrodes 10 and 11 are connected through leads 12 and 13 across opposite terminals of a suitable EMF source 15, which may be a battery or other suitable D.C. power supply, depending upon the size of the body of water. When an electrical potential from source 15 is impressed between the anode 10 and the cathode 11, a current passes through the water and subjects its contents to electrolysis. In order that the electrolyic current may be maintained at a predetermined level, the source 15 is provided with means for varying the potential impressed between the electrodes.

The electrodes 10 and 11 may be comprised of an "inert" metal, such as graphite or high silicon content iron, or at least one of them may be comprised of an active metal, such as copper or aluminum. Materials are considered to be inert when they are consumed in negligible amounts by the electrolytic process. Stated differently, they are inert if they contribute essentially no metallic ions to the water supply. On the other hand, materials are active when they do contribute metallic ions to the water supply. Electrodes comprised of active materials have special applications, as discussed hereinafter.

Large scale experiments have been carried out in algal polluted ponds in the Yellow Springs, Ohio area, and also in a seventeen gallon "lake" in a model "ecosystem" constructed in a laboratory greenhouse. Small scale experiments have been carried out in one liter flasks using algae species selected randomly from Table I. Without exception, in all experiments in which algae was exposed to electrolysis, a destruction in the algal growth potential was observed.

The ecosystem experiments demonstrate the effectiveness of electrolysis and the concomitant effect of electrolysis on fish life. In a representative experiment, the lake was polluted with a dense Euglena bloom and was stocked with carp and tadpoles. Stainless steel electrodes were immersed in the lake about 24 inches apart and were impressed with a direct current of about 24 volts and 125 milliamperes. The bloom was successfully cleared in 72 hours without harm to the coinhabitating carp and tadpoles. About 0.25 kilowatt-hour of electrical energy was consumed.

In the small scale experiments, one liter flasks containing heavy growths of various algae species listed in Table I were completely cleared by electrolysis, with the following data being observed:

TABLE II

| | Voltage (volts) | Current (ma.) | Electrolysis (time, hours) | Kwh. |
|---|---|---|---|---|
| Algae culture: | | | | |
| Cyanidium caldarum | 9 | 80 | 24 | .017 |
| Plectonema boryanum | 15 | 80 | 43 | .052 |
| Chlamydonomas reinhardtii | 13 | 65 | 67 | .056 |
| Chlorella pyrenoidosa | 10.6 | 74.2 | 210 | .165 |

These results, which vary in voltage and current, indicate that the voltage and current requirements to destroy any particular species of algae are dependent upon the type of algae and the conductivity of the nutrient media. Generally, about 15 volts and about 150 milliamperes of electrical energy over a 72-hour period is sufficient to destroy one liter of dense algal growth.

The basic apparatus of FIG. 1 may be used with direct or alternating current in any algal polluted aqueous body. It is particularly suited to home aquaria, swimming pools, and the like because, due to the limited amount of water to be cleaned, it is exceptionally economical. For example, based on a cost of one cent per kilowatt-hour, it is estimated that a dense algal bloom can be destroyed at a cost of about 0.25 cent per liter of algae. Of course, periodic use of electrolysis as a preventive measure would be far less expensive.

The economic feasibility of large scale operation is not presently as attractive as small scale operation. However, the economics may be improved by trapping the hydrogen and oxygen produced at the electrodes during electrolysis and feeding them into a fuel cell which would supply a portion of the electrical requirements of the pollution control system.

In either small scale or large scale operation, the electrolytic process may be operated on a continuous or an intermittent basis. Indeed, it has been found that electrode contamination by deposited impurities may be minimized by periodic reversal of the electrode polarity. Consequently, an automatic polarity reversing device is preferably used to minimize salt build-up on the electrodes.

Although electrolysis systems using inert electrodes readily destroy most types of algal suspensions, algae clinging to objects outside of the electrical field have been found to be particularly resistant. To attack this type of algal pollution, electrolysis systems using one electrochemically inert electrode and one electrochemically active electrode have been found to be particularly effective.

Electrolysis with an "active" electrode is more effective because the electrode releases metallic ions into the water which, above a certain concentration, are toxic to algae. This method takes advantage of the fact that the tolerance of each species of algae to a particular metallic nutrient varies with the concentration of the nutrient. For example, it is known that a low concentration of cupric ion is essential to the growth of most algae, whereas an excessive cupric ion concentration can be lethal.

In another embodiment, therefore, and referring to FIG. 2, the anode 20 is comprised of "active" copper and the cathode 21 is comprised of "inert" stainless steel or high silicon content iron. The copper electrode, when properly polarized, releases copper ions into the electrolyte which, above a predetermined copper ion concentration, are lethal to most forms of algae. Therefore, a variable power supply 23 is used to impress an electrical potential between the electrodes 20 and 21 through lines 24 and 25, and the toxic copper ions enter the electrolyte to kill algae cells clinging to objects outside of the electric field.

In the preferred embodiment, the apparatus includes a copper ion detection electrode 30 for monitoring the copper ion concentration in the aqueous liquid. A switching mechanism 32 is responsive to the electrode 30 and is connected across the lines 24 and 25. When the copper ion concentration reaches a predetermined level of toxicity, the switching mechanism 32 interrupts or reverses the polarity between the electrodes, so that the electrolytic current passes in the opposite direction, and thereby stops the release of copper ions into the electrolyte. This arrangement enables the electrolytic destruction of algae to be controlled continuously and automatically, in response to a predetermined toxic ion concentration for a given body of electrolyte.

Where possible, use of the "active" electrode method should be carried out in an influent stream, to destroy the algae before it accumulates in the main body. This practice is particularly preferred in aquaria and swimming pools where the copper ion concentration may be harmful to fish and human life. In such situations, the active electrolytic method can be carried out in the filter system supplying the pool or aquarium, rather than directly.

In aqueous bodies where fish exist, the current density should be kept below about 50 milliamperes/ft.$^2$ of electrode surface area. Various forms of marine life cannot tolerate current densities substantially above this level. Also, as shown in FIG. 1, screens or shields 35 are preferably used to prevent fish from coming into direct contact with the electrodes.

From the foregoing description and accompanying drawing, it is apparent that each of the electrode electrolysis systems has unique merits in particular aplications. The inert electrode method is especially useful because no chemicals are added to the water which could possibly constitute additional contaminants. The electrochemically active electrode method is particularly more effective for resistive algal pollution problems, such as clogged water filtration systems and the like. Moreover, the active electrode approach may be more attractive than conventional chemical methods since the toxic ion level is more readily controllable.

Thus, instead of using algicides such as cupric sulfate, which is difficult to control, the present invention provides two efficient methods of reducing and preventing algal pollution of water. The electrolytic systems of the present invention may be employed in swimming pools, home and commercial aquariums, small ponds or the like. The same systems may be used on a larger scale to control pollution in rivers, streams, reservoirs, and lakes. As such, the present invention is a significant advance in the art of controlling algal contamination.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. An improved method of reducing algae and/or bacterial pollution in an aqueous body without the necessity of adding electrolytes to said aqueous body comprising the steps of:
(1) immersing a pair of spaced electrodes in said aqueous body, at least one of said electrodes being chemically inert,
(2) impressing between said electrodes an electrolytic potential having a current density which does not exceed 50 milliamperes per square foot of electrode surface area, and
(3) maintaining said potential for a period of 24 hours or longer in order to destroy the algae contamination without harming any human or fish life present in said aqueous body.

2. A method as defined in claim 1 wherein both of said electrodes are inert and are comprised of material selected from the group consisting of graphite, stainless steel, and high silicon content iron.

3. A method as defined in claim 1 inclduing the step of periodically reversing the polarity of the potential between said electrodes to minimize accumulation of contaminants thereon.

4. A method as defined in claim 1 wherein said aqueous body is fed by an influent stream, and said electrodes are immersed in said influent stream.

5. A method as defined in claim 1 wherein one or both of said electrodes are comprised of high silicon content iron.

6. A method as defined in claim 1 further including the steps of:
(4) recovering the hydrogen and oxygen produced at said electrodes as by-products to electrical energy by means of a fuel cell, and
(5) using the electrical energy produced by said fuel cell to supply a portion of the electrical requirements for the electrolysis process.

7. A method as defined in claim 1 wherein one of said electrodes is an electrochemically active anode and the other of said electrodes is an electrochemically inert cathode, said anode being of a material which releases ions of the type which above a predetermined concentration are toxic to algae.

8. A method as defined in claim 7 including the steps of immersing a toxic ion detector electrode in the aqueous body, monitoring the toxic ion concentration in the liquid through said detector electrode, and controlling the toxic ion concentration at said predetermined toxic ion concentration by intermittently interrupting the potential between said anode and cathode.

9. A method as defined in claim 8 wherein said toxic ion concentration is controlled by intermittently reversing the potential between said anode and cathode electrodes.

10. A method as defined in claim 7 wherein said anode is comprised of copper and said anode releases copper ions into said aqueous body.

11. A method as defined in claim 7 wherein said cathode is comprised of a material selected from the group consisting of graphite, stainless steel, and high silicon content iron.

12. A method as defined in claim 7 wherein said aqueous body is fed by an influent stream, and said anode and cathode are immersed in said influent stream.

References Cited
UNITED STATES PATENTS

| | | | |
|---|---|---|---|
| 9,431,188 | 12/1909 | Hartman | 204—149 |
| 1,157,233 | 10/1915 | Lashmet | 204—149 |
| 1,507,121 | 9/1924 | Landreth | 204—149 |
| 2,887,444 | 5/1959 | Lindstaedt | 204—152 |
| 3,180,813 | 4/1965 | Wasp et al. | 204—Dig. 3 |
| 3,334,035 | 8/1967 | Dews et al. | 204—149 X |
| 3,336,220 | 8/1967 | Neidl | 204—149 X |
| 3,414,497 | 12/1968 | Kanai | 204—149 |
| 3,458,414 | 7/1969 | Crane et al. | 204—149 |
| 3,518,176 | 6/1970 | Inoue | 204—149 |
| 3,600,286 | 8/1971 | Sabins | 204—149 |

JOHN H. MACK, Primary Examiner
A. C. PRESCOTT, Assistant Examiner

U.S. Cl. X.R.
204—Dig. 4